A. F. SAEWERT.
TIRE GRIP HOLDER.
APPLICATION FILED JULY 9, 1919.

1,330,497.

Patented Feb. 10, 1920.

Inventor
A.F. Saewert
By Watson E. Coleman
Attorney

UNITED STATES PATENT OFFICE.

ALBERT F. SAEWERT, OF STIRUM, NORTH DAKOTA.

TIRE-GRIP HOLDER.

1,330,497. Specification of Letters Patent. Patented Feb. 10, 1920.

Application filed July 9, 1919. Serial No. 309,664.

*To all whom it may concern:*

Be it known that I, ALBERT F. SAEWERT, a citizen of the United States, residing at Stirum, in the county of Sargent and State of North Dakota, have invented certain new and useful Improvements in Tire-Grip Holders, of which the following is a specification, reference being had to the accompanying drawings.

This invention relates to certain improvements in holding attachments and has relation more particularly to a device of this general character especially designed and adapted for use in connection with an anti-skidding device or tire grip, and it is an object of the invention to provide a novel and improved attachment of this general character which, when in applied position, holds the anti-skidding device or tire grip against slack whereby undue wear is avoided and wherein the attachment effectively operates to hold the anti-skidding device or tire grip against slipping.

It is another object of the invention to provide a novel and improved device of this general character which operates to prevent the anti-skidding device or tire grip from unhooking and falling from applied position and whereby the anti-skidding device or tire grip is held against rattling and striking the mud guard or catching on any parts of the car as now often occurs with anti-skidding devices or tire grips as now generally applied.

The invention consists in the details of construction and in the combination and arrangement of the several parts of my improved holding attachment whereby certain important advantages are attained and the device rendered simpler, less expensive and otherwise more convenient and advantageous for use, as will be hereinafter more fully set forth.

The novel features of my invention will hereinafter be definitely claimed.

Figure 1:
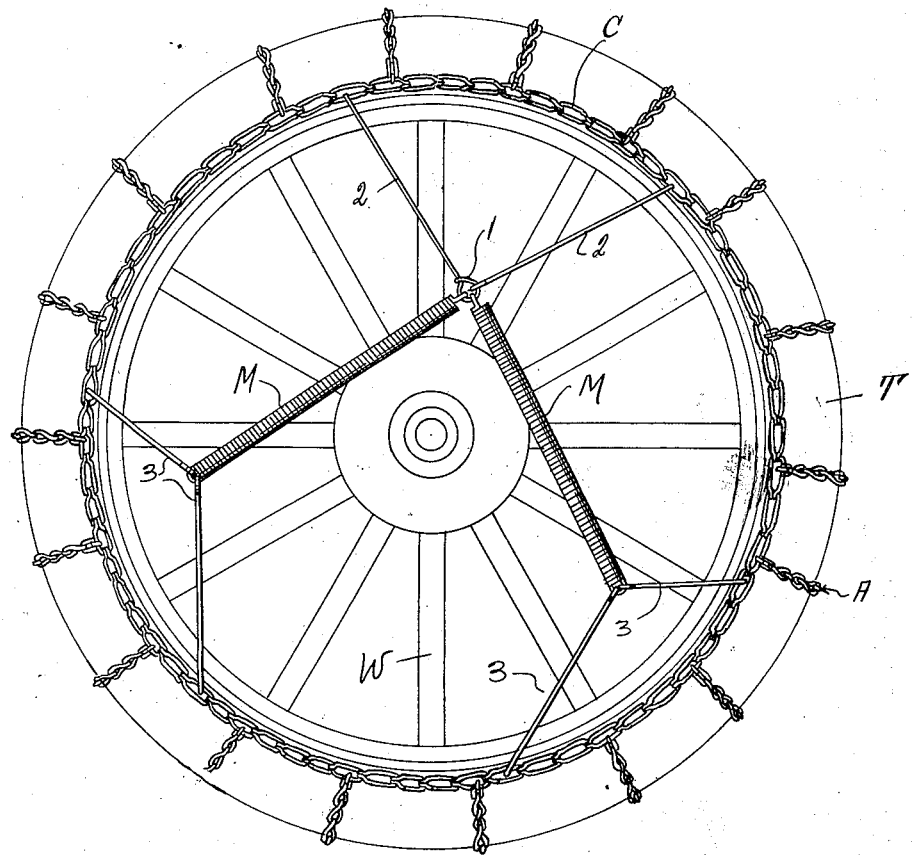
Figure 2:
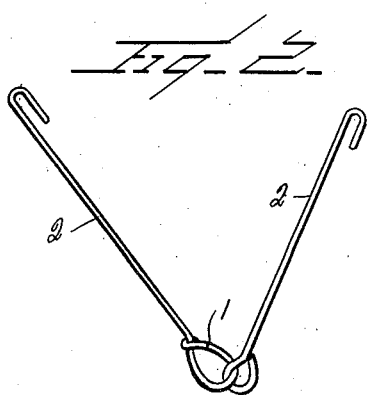

In order that my invention may be the better understood, I will now proceed to describe the same with reference to the accompanying drawings, wherein:

Figure 1 is a view in side elevation illustrating a holding attachment constructed in accordance with an embodiment of my invention and in applied position, and Fig. 2 is a view in perspective illustrating a pair of hook members as herein included.

As disclosed in the accompanying drawings, W denotes a wheel structure having applied in a conventional manner to the tire T thereof an anti-skidding device or tire grip A. The anti-skidding device or tire grip as herein illustrated is of the general type wherein a side chain C is positioned at either side of the tire.

My improved structure comprises two elongated retractile members M preferably coiled springs and similar extremities of the members M are engaged with a coupling member or ring 1 so that when my improved attachment is in applied position the members M are arranged in convergence. Suitably engaged with the coupling member or ring 1 is a pair of elongated hook members 2 adapted for detachable engagement with a side chain C at points spaced circumferentially of the wheel structure. The free or opposite end portion of each of the members M has also engaged therewith a pair of hook members 3 one of said members being of a length greater than the other. The hook members 3 are also adapted to be engaged with a side chain C at points spaced circumferentially of the wheel structure.

When my improved attachment is operatively engaged with a side chain C of an anti-skidding device or tire grip A, the members M are placed under tension so that the side chain C is constantly urged inwardly of the wheel structure W so that the anti-skidding device or tire grip A snugly engages the tire T so that said anti-skidding device or tire grip is held against slack and the resultant undue wear avoided. My improved attachment when applied also holds the anti-skidding device or tire grip A against slipping relative to the tire T and also prevents said device or grip from rattling and striking the mud guard or catching on any parts of the vehicle.

It is also believed to be self-evident that my improved attachment can be applied with convenience and facility and it is believed to be equally obvious that the same is of extremely simple construction and of a type which can be manufactured at an extremely low cost. It is also to be understood that it is only necessary to employ a single attachment constructed in accordance with my invention with an anti-skidding device or tire grip.

As herein embodied the coupling member or ring 1 comprises an integral part of one of the hook members 2.

From the foregoing description, it is thought to be obvious that a holding attachment constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A holding attachment for a tire grip including a side member comprising a pair of retractile members having similar ends connected, a pair of hook members arranged at the connected end portions of the retractile members, and a pair of hook members carried by the opposite end portion of each of the retractile members.

2. A holding attachment of the class described comprising a pair of retractile members, a coupling member connecting similar end portions of the retractile members, a pair of hook members carried by the coupling member, and a pair of hook members carried by the opposite end portion of each of the retractile members.

3. A holding attachment of the class described comprising a pair of retractile members, a coupling member connecting similar end portions of the retractile members, a pair of hook members carried by the coupling member, and a pair of hook members carried by the opposite end portion of each of the retractile members, the hook members of the last named pair being of different lengths.

4. A holding attachment of the class described, comprising a pair of retractile members having similar ends connected, said connected end portion of the members being provided with relatively movable attaching means constructed and arranged to be connected to a tire grip, the opposite end portion of each of the retractile members being also provided with relatively movable attaching means also constructed and arranged to be connected to a tire grip.

In testimony whereof I hereunto affix my signature in the presence of two witnesses.

ALBERT F. SAEWERT.

Witnesses:
W. H. COLE,
ANDREW McQUAY.